March 12, 1935. E. E. SCHNELLE 1,993,809
ANTIFRICTION BEARING FOR CENTERS, SPINDLES, ETC
Filed May 31, 1930 2 Sheets-Sheet 1

INVENTOR
ERNEST E. SCHNELLE
BY
ATTORNEY

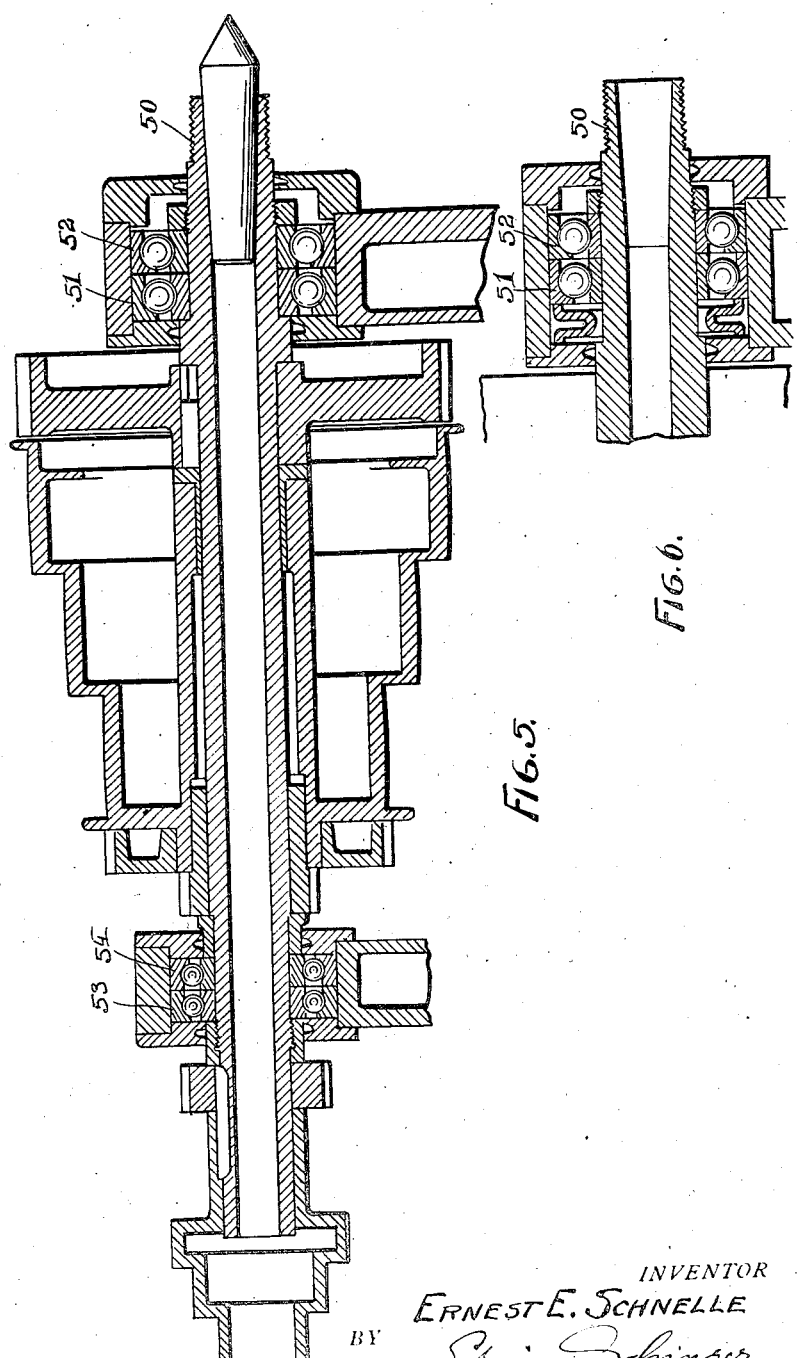

Patented Mar. 12, 1935

1,993,809

UNITED STATES PATENT OFFICE 1,993,809

ANTIFRICTION BEARING FOR CENTERS, SPINDLES, ETC.

Ernest E. Schnelle, Rochester, N. Y.

Application May 31, 1930, Serial No. 457,680

3 Claims. (Cl. 82—33)

This invention relates to rotating spindles supported by antifriction bearings and has for its object to provide a construction for such spindles which makes possible the use of a plurality of combined radial and thrust antifriction bearings contacting with one another to supplement the radial and thrust load carrying capacities.

This and other objects of the invention will be apparent from the drawings, the specification and the appended claims forming a part thereof.

In the accompanying drawings:

Figure 5 is a sectional view of a lathe head having a spindle supported by ball bearings in the arrangement embodying my invention.

Figure 6 is a detail sectional view of a modified form of the forward end of the spindle of a lathe head in which the ball bearings embodying my invention are cushioned by a cushioning member.

In the several figures of the drawings like reference numerals indicate like parts.

The antifriction center forming the subject matter of my present invention materially increases the thrust and radial load capacity of such centers without increasing the general dimensions of it. In all antifriction centers now made and sold the antifriction bearings are arranged in such a manner that the thrust load, when applied thereto, will not be equally sustained by all of the antifriction bearings without subjecting at least one of them to an over load. This invariably results in the crushing of one of the bearings before the maximum load has been applied to the center.

In my present invention this has been overcome by the exclusive use of combined radial and thrust bearings and by arranging these bearings and contacting them with one another in such a manner that when the thrust is applied against the center the bearings will cooperate and supplement each other so that none of them can be overloaded by the thrust individually unless all of them are overloaded by the thrust at the same time.

As illustrated in the several figures of the drawings the center is in each case supported by combined radial and thrust antifriction bearings, preferably two in number, and these bearings resist the thrust as well as the radial pressure against the center.

Figure 1:
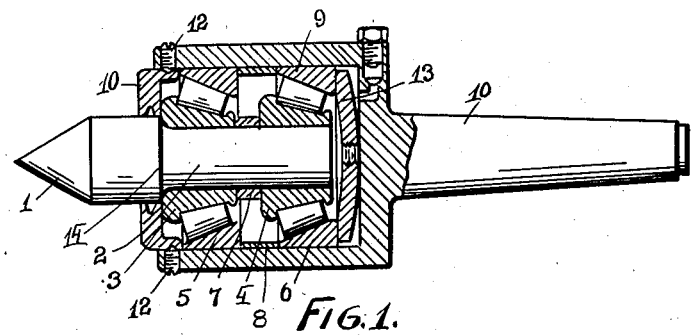
Figure 1 is a sectional view of a rotating center having a spindle supported by roller bearings in the arrangement embodying my invention.

In the type of center illustrated in Figure 1 the center point or head 1 is formed on the outer end of the spindle 2. Surrounding this spindle are two combined radial and thrust antifriction roller bearings having the cones 3 and 4 and the cups 5 and 6 respectively. Both roller bearings have the same load carrying capacity and have therefore practically the same dimensions. A spacing member 7 surrounding the spindle 2 separates the cones 3 and 4 of the two roller bearings and a spacing member 8 separates the cups 5 and 6 of the same two roller bearings.

The spindle and its roller bearings are located in the chamber 9 which forms an extension of the tapered shank 10. The front of the chamber 9 is closed by the cover plate 11 which is suitably locked thereto by the set screws 12, 12 which are threaded thru the wall of the chamber 9 and extend into recesses provided for this purpose in the periphery of the cover plate 11. The head with its center point projects centrally thru an opening in the cover plate and is thus free to engage the stock which is to be supported by it.

To prevent an overload pressure applied to the center from crushing the rollers, a yielding member 13, in the form of a concave washer, is placed behind the innermost of the antifriction bearings with a suitable clearance behind the end of the spindle and the concaved face of the yielding member. This yielding member is mounted in the rear of the chamber 9 with its outer portion engaging the end of the cup 6 of the innermost antifriction bearing. When pressure is applied against the center, it is transmitted by the shoulder 14 between the spindle 2 and head 1 to the cone 3 of the first of the antifriction bearings. The rollers and cup of this antifriction bearing thus resist the pressure from the center point first. However, this same pressure is also transmitted to the cone 4 and the cup 5 of the second antifriction bearing by means of the spacing members 7 and 8 respectively and as this second antifriction bearing is a duplicate combination radial and thrust bearing from the first antifriction bearing placed in exactly the same position, it functions as a supplemental bearing therefor so that the two bearings combined can withstand a pressure just twice as much as one bearing would be able to withstand alone.

Should an excess pressure be applied to the center which the two combined bearings cannot withstand, the spring member 13 will yield to such a pressure and thus prevent the bearing members from being crushed under the overload.

As previously pointed out rotating centers have heretofore been supported by two or more antifriction bearings and possibly by bearings which are arranged to have the radial and end thrust applied thereto in the same direction but in all such cases the separate antifriction bearings are either so arranged that they take up the thrust, both radial and end thrust, in opposite directions, and if they are arranged to take up the thrust in the same direction, one of the bearings is smaller than the other so that the smaller bearing will be crushed long before the larger bearing is subjected to its maximum load.

The use of spacing sleeves between the cones, as well as the cups of the antifriction bearings, makes possible the use of antifriction bearings having practically the same load capacity and practically the same diameter, and the arrangement of these bearings in tandem whereby the one bearing supplements the other in its load carrying capacity. Thus as illustrated in Figure 1 of the drawings, part of the thrust against the cone of the first bearing is transmitted to the cone of the second bearing and part of the thrust of the cup of the first bearing is transmitted to the cone of the second bearing with the result that each bearing is subjected to the same load and is capable of withstanding the same load.

Figure 2:
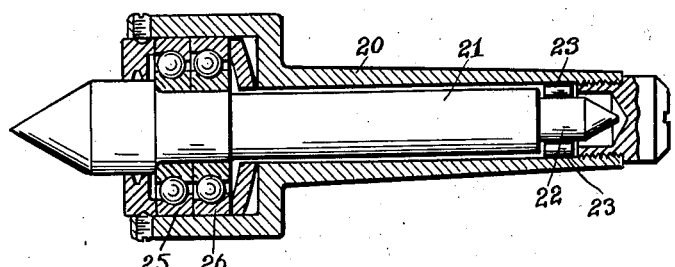
Figure 2 is a sectional view of a rotating center having a spindle supported by ball bearings in the arrangement embodying my invention.
Figure 3:
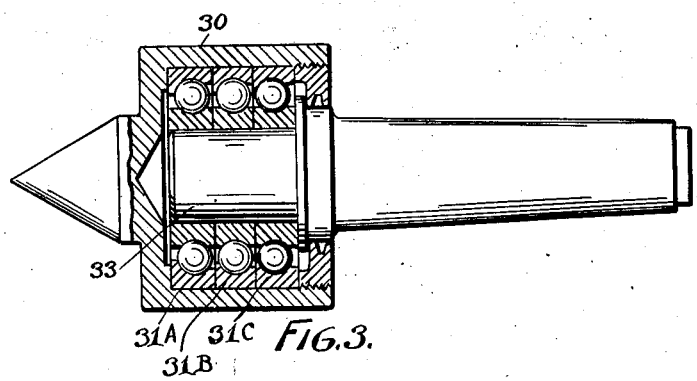
Figure 3 is a sectional view of a modified form of rotating center supported by ball bearings on a spindle in the arrangement embodying my invention.
Figure 4:
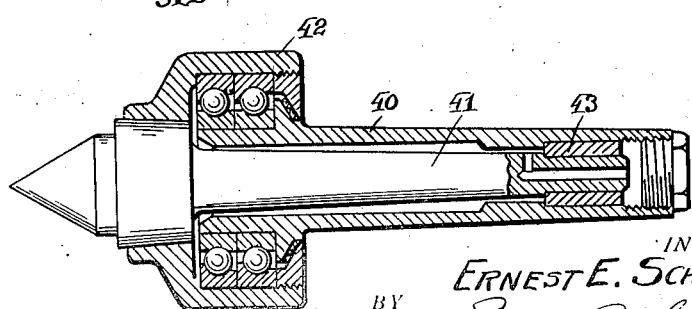
Figure 4 is a sectional view of another modified form of rotating center supported by ball bearings on a spindle in the arrangement embodying my invention.

In the modifications of the construction of the rotating centers, illustrated in Figures 2, 3 and 4, the same principle is applied to ball bearings. Instead of using spacing sleeves between the bearings, the cones and cups are fitted to each other so as to transmit the pressure or thrust directly from one to the other.

In the type of center illustrated in Figure 2 the shank 20 is hollow and the spindle 21, carrying the center point, extends rearwardly thru the hollow spindle and has a roller bearing 22 provided thereon which is concentrically supported in the hollow shank by means of the cylindrical antifriction rollers 23, 23. The front of the spindle is supported in the chamber by the combined radial and end thrust ball bearings 25 and 26 which, as above pointed out, have their cones and cups placed end to end so as to supplement each other's load carrying capacity.

In the type of center illustrated in Figure 3 the center point has a hollow rearwardly projecting head 30. This head is supported on three of the combined radial and thrust ball bearings 31A, 31B and 31C which are mounted on the reduced forward portion 33 of the shank 34 and are arranged thereon, as pointed out above, with the cone and cup of one bearing placed against the corresponding cone and cup of the second bearing.

The construction of the rotating center, illustrated in Figure 4, is similar to that illustrated in Figure 3, except that in the center illustrated in Figure 4, the shank 40 thereof is hollow so that a central rearward extension 41 of the center point, located centrally of the hollow head 42 thereof, can project into the hollow shank and have the reduced rear end 43 of the rearward extension mounted to rotate in a bushing 44 located in the hollow shank.

In Figure 5 I have illustrated the subject matter of my invention applied to a spindle of a lathe head. As illustrated in this figure the spindle 50 is supported at the right hand end by two combined radial and thrust bearings 51 and 52 and at the left hand end by two ball bearings 53 and 54. The latter may be plain radial bearings, as the left hand end of the spindle 50 has only radial pressure applied to it by suitable belting with which the cone pulley of the lathe head is driven.

In conclusion it is again pointed out that by the arrangement of combined radial and thrust bearings of practically the same dimensions, one behind the other, the radial and thrust load capacity of a spindle may be increased at will without subjecting one of the bearings to an overload under which it will be crushed. Of course it is understood that the contact between the plurality of such combined radial and thrust bearings must be very accurate both between the successive cones and successive cups in order to have each bearing work under identically the same condition and with the same pressure applied thereto.

The combination of a series of combined radial and thrust bearings in the manner illustrated and described thus makes it possible to subject a spindle supported by these bearings to any desired load within the load capacity of all of the bearings and this load may be either a radial or thrust load because each bearing is capable to supplement the other in the particular load carrying capacity that is required.

I claim:

1. In an antifriction support for a rotating member the combination of two angular contact antifriction bearings of substantially the same diameter each having substantially the same inner and the same outer race spaced by antifriction members having substantially the same load carrying capacity, said bearings being arranged on the rotating member and mounted thereon so as to have the end thrust of the rotating member simultaneously transmitted to the same race of each antifriction bearing so as to provide a substantially equal compression of the antifriction members of substantially equal load carrying capacity between the races of both bearings.

2. In an antifriction support for a rotating member the combination of two angular contact antifriction bearings of substantially the same diameter mounted on the rotating member and contacting each other each having their corresponding inner and outer races arranged so as to have the end thrust of the rotating member simultaneously transmitted to the same race of both of said bearings and have the antifriction members of both bearings subjected to substantially equal compression.

3. In an antifriction support for a rotating member the combination of two angular contact antifriction bearings of substantially the same diameter arranged to have their contact angle inclined in the same direction for the purpose of simultaneously transmitting the end thrust to both of said bearings said antifriction bearings being mounted on said rotating member to have all of the races of the antifriction bearings resist an end thrust against the rotating member in the same manner.

ERNEST E. SCHNELLE.